Patented May 20, 1947

2,420,750

UNITED STATES PATENT OFFICE 2,420,750

PROCESS FOR POLYMERIZING CONJUGATED BUTADIENES IN THE PRESENCE OF A HEXA-ARYL ETHANE, AND PRODUCTS THEREOF

David Josefowitz, New York, N. Y., assignor to Publicker Industries Inc., a corporation of Pennsylvania No Drawing. Application November 17, 1944, Serial No. 563,997

8 Claims. (Cl. 260—93)

The present invention relates to the polymerization of butadiene and of other diolefines and conjugated dienes and it relates more particularly to new and improved processes for carrying out such polymerization so as to give products having desirable properties.

An object of the present invention is to provide new and improved polymerized substances containing no oxygen and having such desirable properties as high transparency, little color, low power loss factor, and high resistance to aging and embrittlement.

A further object of the present invention is to provide new and improved processes for polymerizing butadiene and other diolefines and conjugated dienes either alone (homo-polymerization) or with other suitable substances (co-polymerization).

Another object of the present invention is to provide processes for carrying out such polymerization which will give products having new and important properties.

Still another object of the present invention is to provide initiators or catalysts for such polymerization capable of giving polymers of relatively high average molecular weight within a relatively short time, which polymers possess the desirable properties of being light in color and transparent, of not "aging" or becoming brittle with time, and of possessing relatively low dielectric constant and low power loss factor.

Other objects and advantages of the present invention are apparent in the following detailed description and appended claims.

The use of compounds of the peroxide or ozonide type as initiators or catalysts for polymerization of butadiene and other polymerizable substances has been well-known. These compounds have been widely used and are capable of producing polymers of relatively high average molecular weight within a relatively short time.

The use of these peroxide or ozonide type initiators, has, however, been accompanied by certain disadvantages, especially where polymers of particular purity have been desired. Thus, the polymers resulting from the conventional processes always contain small amounts of oxygen, either in the initiator fragments chemically incorporated in the macromolecules or in the unreacted initiator molecules physically held in the reaction product. In both cases, this oxygen, which can be present in various chemical forms, as for example, peroxide oxygen, ether oxygen, carbonyl oxygen, etc., impairs the electrical properties of the final polymer and also accelerates the slow chemical and mechanical deterioration of the products upon prolonged exposure to light, heat or repeated mechanical and electrical stress.

Accordingly, it has been proposed in the past to minimize the deleterious action of this oxygen in the polymer by the addition thereto of stabilizers, which are reducing agents and thus are capable of counteracting the action of the oxygen. However, the incorporation of these stabilizers into the polymer is frequently difficult and, in many cases, impairs such valuable properties of the polymer as transparency, color, power loss factor, etc.

According to the present invention it has, for the first time, been found that certain organic compounds, not containing oxygen, can be used successfully as initiators for the polymerization of diolefines, particularly of conjugated dienes such as butadiene, to give polymers which contain no oxygen and which, accordingly, are free from the undesirable properties of oxygen-containing polymers as outlined above, and which do not require stabilizers.

Generally speaking, the present invention contemplates the polymerization of such diolefines employing, as initiators, oxygen-free organic compounds capable of decomposing, under the conditions of the reaction, to some extent, to give radicals or radical-type fragments which have sufficiently long average life as such to render them capable of reacting with monomer molecules and thereby to initiate the polymerization.

It has been suggested in the past that such compounds as tetraphenyl succinodinitril and benzene diazonium bromide can be used to initiate the polymerization of styrene, an aromatically-substitute mono-olefin, but the polymers obtained have been of very low average molecular weight and without practical value.

According to the present invention, however, it has been found that the polymerization of diolefines, particularly conjugated dienes such as butadiene and its homologs and analogs, is successfully initiated by oxygen-free compounds capable of decomposing into free radicals, and that the products obtained have high average molecular weight and desirable properties.

More specifically, it has been found that highly and heavily substituted ethanes, such as hexaphenyl ethane, hexabiphenyl ethane, hexatolyl ethane, etc., can be used successfully to initiate polymerization of butadiene and other diolefines.

It has been found further that other oxygen-free radical giving compounds which can be used successfully as initiators are diazonium compounds, either aliphatic or aromatic, such as, for example, diazomethane, phenyl diazonium chloride, etc.

Still another group of oxygen-free radical-giving compounds which have been found successful as initiators are aliphatic and aromatic azo-compounds, such as azomethane, azobenzene, etc.

Still other oxygen-free radical-giving compounds which have been found successful as initiators are heavily substituted hydrazines, such as tetraphenyl or tetratolyl hydrazines, and other compounds such as methyl azide, ethyl azide, azomethane, azoisopropane, azotoluene, benzalizine, methyl isopropyl diamide, dimethyl triazene, and other oxygen-free compounds having a nitrogen-to-nitrogen linkage.

Among the diolefines which have been found to yield satisfactory auto-polymers or co-polymers with the initiators set forth above are butadiene, isoprene, methyl pentadiene, chloroprene, etc.

According to the present invention, polymerization can be effected under varying conditions and with varying results as to the physical properties and the degree of polymerization of the final product. Thus, there have been obtained polymers ranging from viscous oils to sticky rubbery elastics and to hard resins, representing degrees of polymerization ranging from approximately 50 to more than 1000.

Generally speaking, the polymers obtained by the processes of the present invention contain no oxygen and exhibit the desired properties of polymeric hydrocarbons of a high degree of purity, including good transparency, little color, low power loss factor, resistance to aging and embrittlement, etc.

The following are illustrative examples of the processes of the present invention:

EXAMPLE 1

100 parts of butadiene of high purity and approximately 1 part of hexaphenyl ethane were mixed in a container which was cooled with solifified carbon dioxide. The container was then sealed and placed in a constant temperature bath wherein it was maintained at a temperature of approximately 110° C. for approximately 48 hours. The container was then opened and a highly vicous transparent product was obtained which was light in color and which was completely soluble in toluene and benzene. Its intrinsic viscosity indicated that the product had a polymerization degree of about 100.

EXAMPLE 1—A

The procedure of Example 1 was repeated with varying amounts of hexaphenyl ethane ranging from 0.5 part to 2 parts at temperatures varying between 110° and 120° C. for times varying from 24 to approximately 100 hours. At very low concentrations of initiator the reaction proceeded very slowly. The optimum concentration was approximately 1%; the rate of reaction as well as the yields dropping off somewhat with higher concentrations of initiator. The yields ranged from approximately 20 to 80%.

EXAMPLE 2

The procedure of Example 1 was followed except that hexabiphenyl ethane or hexatolyl ethane was used (in place of the hexaphenyl ethane). These two initiators, which give greater free radical concentrations at lower temperatures than does hexaphenyl ethane, were found effective in polymerizing butadiene at considerable lower temperatures. Thus, products comparable to that obtained in Example 1 were obtained when the polymerization was carried out at approximately 100° C. for approximately 48 hours.

EXAMPLE 3

100 parts of butadiene of high purity and approximately 10 parts of a 2.8% solution of diazomethane in ether were mixed in a container cooled with solidified carbon dioxide. The container was then sealed and placed in a constant temperature bath where it was heated for approximately 24 hours at approximately 110° C. The tube was then opened and the product was found to be highly gelatinous, sticky, light yellow and transparent. The product was only partly soluble in benzene and toluene. The soluble fraction was found to have a polymerization degree of approximately 500.

EXAMPLE 3—A

The procedure of Example 3 was repeated at varying initiator concentrations ranging from approximately 0.3 to 1.0% (the catalyst being added in the form of an ether or benzene solution in sufficient amount to make up the required concentration) at varying temperatures and reaction times. It was found that the rate of polymerization increased with increase of temperature and increased with increase of initiator concentration up to a maximum of approximately 0.6% of the diazomethane (approximately 20% of a 3% ether solution). The yields ranged from approximately 20 to 80% and the products obtained were rubbery, cross-linked and rather insoluble in benzene and toluene. When a benzene solution of the diazomethane was used in place of an ether solution, the yields were somewhat lower while the products were somewhat more soluble. When the polymerization was carried out at approximately 125° C. with freshly prepared and re-distilled diazomethane, the results were found to be considerably improved over those of Example 3; the rate of reaction, in particular, being notably faster.

EXAMPLE 4

The procedure of Example 3 was repeated using 1 part of phenyl diazonium chloride as the initiator (in place of the diazomethane solution). The product obtained was generally comparable to that of Example 3 except that a polymerization degree of approximately 350 was indicated.

EXAMPL5 4—A

The procedure of Example 4 was repeated with varying concentrations of catalyst and with variations of time and temperature similar to those discussed above under Example 1—a. The yields ranged from about 10 to 30% and generally increased with amount of initiator employed. No appreciable increase in yield resulted from reaction times exceeding approximately 48 hours. The products were slightly brown in color; the color increasing with increase in amount of initiator employed.

EXAMPLE 5

100 parts of butadiene of high purity and approximately 1 part of azobenzene were mixed in a container cooled with solidified carbon dioxide. The container was then sealed and placed in a constant temperature bath where it was heated for approximately 48 hours at a temperature of 110° C. The tube was then opened and the product obtained was found to be highly viscous and reddish in color. The product was entirely soluble in toluene and, from the intrinsic viscosity of a toluene solution, the polymerization degree of the product was found to be about 150.

EXAMPLE 6

100 parts of butadiene of high purity and approximately 1 part of azobenzene were mixed in a container cooled with solidified carbon dioxide. The container was then sealed and placed in a constant temperature bath for approximately 24 hours at approximately 110° C. The container was then transferred to a constant temperature bath wherein it was heated at 180° C. for approximately 24 hours additional. The resulting product was rubbery in nature and was only partly soluble in benzene and toluene. The soluble fraction had a polymerization degree of about 1100.

EXAMPLE 7

100 parts of butadiene of high purity was polymerized with diazo amino benzene in concentrations ranging from approximately 0.5 to 2.0% at a temperature of approximately 125° C. The optimum concentration appeared to be approximately 0.75% and gave approximately 80% polymerization in 24 hours and above 90% in 48 hours. At higher initiator concentrations, the rate of reaction increased only slightly while the color of the final polymer became appreciably deeper.

EXAMPLE 8

The procedure of Example 7 was repeated using isoprene in place of butadiene. Comparable results were obtained and 95% of the isoprene was found to be polymerized after 48 hours.

EXAMPLE 9

Approximately 100 parts of 2 methyl pentadiene (an isomeric mixture containing approximately 60% of the 2-4 diene; the mixture being incapable of separation by distillation and boiling at 74–75° C.) was mixed with approximately 20 parts of a 3% diazomethane solution in ether; the container being cooled in Dry Ice. The container was then sealed and polymerization carried out at different temperatures and for different times; namely at 115° C. for 24 hours, at 125° C. for 24 hours, and at 125° C. for 48 hours. The products of the polymerization were isolated by precipitating the polymer from its solution (in unreacted monomer) with alcohol and drying it in a vacuum oven.

The procedure was repeated using approximately one part of diazo amino benzene as the catalyst and was again repeated using a conventional oxygen-type catalyst, namely approximately one part of benzoyl peroxide.

The results are shown in the following table:

*Table I*

| Catalyst | Yield (115° C.) (24 hrs.) | Yield (125° C.) (24 hrs.) | Yield (125° C.) (48 hrs.) |
|---|---|---|---|
| | Per cent | Per cent | Per cent |
| Benzoyl peroxide (1 part) | 10 | 25 | 40 |
| Diazo amino benzene (1 part) | 20 | 45 | 60 |
| Diazo methane (10 parts of 3% solution) | 10 | 20 | 35 |
| Diazo methane (20 parts of 3% solution) | 20 | 35 | 50 |

EXAMPLE 10

The procedure of Example 9 was repeated employing cyclopentadiene instead of the 2 methyl pentadiene at the following temperatures and times: 125° C. for 60 hours, 135° C. for 48 hours, 145° C. for 48 hours and 170° C. for 24 hours.

*Table II*

| Catalyst | Yield (125° C.) (60 hrs.) | Yield (135° C.) (48 hrs.) | Yield (145° C.) (48 hrs.) | Yield (170° C.) (24 hrs.) |
|---|---|---|---|---|
| | Per cent | Per cent | Per cent | Per cent |
| Benzoyl peroxide (1 part) | 5 | 30 | 55 | 70 |
| Diazo amino benzene (1 part) | 10 | 40 | 65 | 85 |
| Diazo methane (20 parts of 3% solution) | 5 | 35 | 55 | 65 |

Generally speaking, it has been found that all of the above oxygen-free substances, which give free radicals or radical-type fragments to a lesser or greater extent, serve as initiators for the polymerization of diolefines. It has been found, as a rule, that those substances which more readily dissociate at low temperatures to give higher free-radical concentrations are more effective as initiators.

While, with the initiators of the present invention, it is possible to polymerize diolefines in the continuous liquid phase, the present invention also contemplates such polymerization in other ways, as for example, in aqueous emulsion with or without the addition of alkali metal or other catalysts. The initiators of the present invention are primarily intended to replace the peroxide or other oxygen compounds which ordinarily are used in the polymerization, and which, as set forth hereinabove, impart undesirable properties to the final product.

The initiators of the present invention differ from true catalysts in that they react with the monomer to form an activated complex which is the nucleus for the growth of a polymer chain molecule. The amount of initiator used up is in stoichiometric proportion to the number of polymer molecules formed. Due, however, to the fact that the final polymer has much greater average molecular weight than the initiator (the ratio being approximately 100,000 or more to about 100), the actual weight of initiator used up is relatively small.

As stated above, the initiators of the present invention have been found effective with butadiene and other diolefines and conjugated dienes, as distinguished from substituted monoolefines such as styrene and other vinyl derivatives.

While the present invention contemplates the polymerization of other diolefines, it is particularly adapted for use in connection with the polymerization of such conjugated dienes as butadiene and its homologs and analogs.

The polymerized products obtained according to the present invention are, as previously stated, free from oxygen and have such desirable properties as high transparency, low color, low power loss factor, and high resistance to aging and embrittlement, while containing and requiring no stabilizers.

Having thus described my invention, what I claim as new and desire to protect by Letters Patent is:

1. A synthetic polymer of a conjugated butadiene hydrocarbon, said polymer having chemically combined therewith 0.5 to 2.0 parts of a hexa-aryl ethane per 100 parts of butadiene hydrocarbon.

2. A synthetic polymer of a conjugated butadiene hydrocarbon, said polymer having chemically combined therewith 0.5 to 2.0 parts of hexaphenyl ethane per 100 parts of butadiene hydrocarbon.

3. A synthetic polymer of a conjugated butadiene hydrocarbon, said polymer having chemically combined therewith 0.5 to 2.0 parts of hexabiphenyl ethane per 100 parts of butadiene hydrocarbon.

4. A synthetic polymer of a conjugated butadiene hydrocarbon, said polymer having chemically combined therewith 0.5 to 2.0 parts of hexatolyl ethane per 100 parts of butadiene hydrocarbon.

5. In a process for polymerizing a conjugated butadiene hydrocarbon in bulk to produce synthetic polymerized substances, the step which comprises carrying on the polymerization in the presence of 0.5 to 2.0 parts of a hexa-aryl ethane per 100 parts of butadiene hydrocarbon, at a temperature of 100–120° C. for 24–100 hours.

6. In a process for polymerizing a conjugated butadiene hydrocarbon in bulk to produce synthetic polymerized substances, the step which comprises carrying on the polymerization in the presence of 0.5 to 2.0 parts of hexaphenyl ethane per 100 parts of butadiene hydrocarbon, at a temperature of 100–120° C. for 24–100 hours.

7. In a process for polymerizing a conjugated butadiene hydrocarbon in bulk to produce synthetic polymerized substances, the step which comprises carrying on the polymerization in the presence of 0.5 to 2.0 parts of hexabiphenyl ethane per 100 parts of butadiene hydrocarbon, at a temperature of 100–120° C. for 24–100 hours.

8. In a process for polymerizing a conjugated butadiene hydrocarbon in bulk to produce synthetic polymerized substances, the step which comprises carrying on the polymerization in the presence of 0.5 to 2.0 parts of hexatolyl ethane per 100 parts of butadiene hydrocarbon, at a temperature of 100–120° C. for 24–100 hours.

DAVID JOSEFOWITZ.

REFERENCES CITED

The following references are of record in the file of this patent:

UNITED STATES PATENTS

| Number | Name | Date |
| --- | --- | --- |
| 2,313,233 | Fryling | Mar. 9, 1943 |
| 2,375,987 | Garvey | May 15, 1945 |
| 2,376,015 | Semon | May 15, 1945 |
| 2,376,963 | Garvey | May 29, 1945 |
| 2,376,014 | Semon | May 15, 1945 |

OTHER REFERENCES

Balandina, Chemical Abstracts, vol. 31, columns 4529, 4530 and 4531 (1937), 260–93 (Lit.).

Foreign Petroleum Technology, vol. 2, No. 6, pp. 20–28 (1934), 260–93 (Lit.).